United States Patent
Rodgers et al.

(10) Patent No.: US 8,576,521 B2
(45) Date of Patent: Nov. 5, 2013

(54) ADAPTIVE LIGHT DETECTION FOR ARC MITIGATION SYSTEMS

(75) Inventors: Barry Rodgers, Raleigh, NC (US); Henry Patrick, Raleigh, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 80 days.

(21) Appl. No.: 13/210,943

(22) Filed: Aug. 16, 2011

(65) Prior Publication Data

US 2013/0044395 A1 Feb. 21, 2013

(51) Int. Cl.
H02H 9/08 (2006.01)

(52) U.S. Cl.
USPC .......................................................... 361/42

(58) Field of Classification Search
USPC .......................................................... 361/42
See application file for complete search history.

(56) References Cited

U.S. PATENT DOCUMENTS

| | | | |
|---|---|---|---|
| 2,043,099 A | 6/1936 | Hanna | |
| 4,067,052 A | 1/1978 | Neuhoff | 361/42 |
| 4,516,022 A | 5/1985 | Lindgren | 250/227 |
| 4,702,553 A | 10/1987 | Buchmüller et al. | 350/96.29 |
| 5,714,886 A | 2/1998 | Harris | 324/601 |
| 5,986,060 A | 11/1999 | Li et al. | 530/351 |
| 6,229,680 B1 | 5/2001 | Shea | 361/42 |
| 6,247,003 B1 | 6/2001 | Cummins et al. | 706/22 |
| 6,337,427 B1 | 1/2002 | Alario et al. | 585/319 |
| 6,433,976 B1 | 8/2002 | Phillips | 361/42 |
| 6,525,918 B1 | 2/2003 | Alles et al. | 361/93.1 |
| 6,621,669 B1 | 9/2003 | Haun et al. | 361/42 |
| 7,069,116 B2 | 6/2006 | Kunsman et al. | 700/48 |
| 7,391,218 B2 | 6/2008 | Kojori et al. | 324/520 |
| 7,536,914 B2 * | 5/2009 | Land et al. | 73/705 |
| 2002/0118022 A1 * | 8/2002 | Dring et al. | 324/536 |
| 2003/0151414 A1 | 8/2003 | Shea | 324/555 |
| 2004/0054921 A1 | 3/2004 | Land, III | 713/200 |
| 2008/0077368 A1 | 3/2008 | Nasle | 703/4 |
| 2009/0161272 A1 * | 6/2009 | Asokan et al. | 361/43 |
| 2010/0072355 A1 * | 3/2010 | Schweitzer et al. | 250/252.1 |
| 2010/0321838 A1 | 12/2010 | Wu et al. | 361/42 |

FOREIGN PATENT DOCUMENTS

DE 3141374 A1 4/1983

OTHER PUBLICATIONS

PCT International Search Report for International Application No. PCT/US2012/049936 mailed Dec. 17, 2012 (4 pages).
PCT International Written Opinion for International Application No. PCT/US2012/049936 mailed Dec. 17, 2012 (6 pages).

* cited by examiner

*Primary Examiner* — Jared Fureman
*Assistant Examiner* — Kevin J Comber
(74) *Attorney, Agent, or Firm* — Nixon Peabody LLP

(57) ABSTRACT

A controller-based detection system configured to adaptively learn to distinguish between detected light that is indicative of an arc fault event and detected light that is not related to an arc fault event. In particular, the detection system is configured to observe the electrical power system as it is operated under various conditions to induce light events that are unrelated to arc fault events. Using the observed information about the light events that are unrelated to arc fault events, the detection system determines one or more detection algorithms. During normal operation of the electrical power system, the adaptively determined one or more detection algorithms are utilized to identify arc fault events in the electrical power system.

22 Claims, 3 Drawing Sheets

ADAPTIVE LIGHT DETECTION FOR ARC MITIGATION SYSTEMS

FIELD OF THE INVENTION

The present disclosure relates generally to electrical arc fault detection and, more particularly, to an adaptive, controller-based arc fault protection system for detecting and mitigating arc faults in the presence of other light sources.

BACKGROUND

In the past, arc fault protection systems have been designed to detect and mitigate destructive arcing in electrical power systems. One approach employs light sensors to detect a magnitude of light intensity present in the system and compare the magnitude to a fixed threshold to determine whether the detected light is indicative of an arc fault. When an arc fault is detected, the arc protection system indicates such and a protection device is actuated to mitigate the arc.

Generally, the systems provide a relatively low sensitivity threshold to detect the presence of an arc fault event before it becomes too destructive. However, during operation of the electrical power system, the light sensors may detect light from sources that are not related to destructive arcing such as, for example, switches, lamps, or the environment. Detection of light from these other sources can erroneously actuate the protection device (i.e., nuisance tripping). This erroneous actuation of the protection device is exacerbated by the need to set the system to be relatively sensitive to light.

While arc protection systems have been designed to have different light sensitivity levels at the time of manufacture, there is a potential that a user may install a system having the wrong sensitivity level. Moreover, over time, the operating conditions of an electrical power system often changes due to, for example, corroded, worn or aged wiring, connectors, contacts or insulation, loose connections, wiring damaged by nails or staples through the insulation, and electrical stress caused by repeated overloading, lighting strikes, power surges, etc. As a result of such changes in the operating conditions of an electrical power system, an arc protection system that once was suitable to detect arc faults may experience unacceptably frequent nuisance tripping of the protection device.

BRIEF SUMMARY

The present disclosure provides a flexible and adaptive approach to identifying and mitigating arc fault events in an electrical power system while adaptively ignoring "benign" or non-arc fault events that would otherwise be mistaken for an arc fault. In short, the present disclosure avoids tripping on "false positives" and more accurately distinguishes between true arc fault events and events that otherwise may share certain characteristics of an arc fault (such as generating a sudden flash of light) but which in fact are not arc fault events. According to aspects of the present disclosure, a controller-based detection system is configured to adaptively learn to distinguish between detected light that is indicative of an arc fault event and detected light that is not related to an arc fault event. In particular, the detection system is configured to observe the electrical power system as it is operated under various conditions to induce light events that are unrelated to arc fault events. Using the observed information about the light events that are unrelated to arc fault events, the detection system determines one or more detection algorithms. During normal operation of the electrical power system, the adaptively determined one or more detection algorithms are utilized to identify arc fault events in the electrical power system. The detection system can be configured to verify the adaptively determined detection algorithms by operating the electrical power system to induce further known light events and verifying whether the detection algorithms identify an arc fault event.

Accordingly, the present disclosure provides systems and methods that address problems associated with nuisance tripping of an arc fault protection device due to the presence of other light sources in an electrical power system. Additionally, the present disclosure provides a system that can be adaptively adjusted to account for changed conditions (e.g., aging) and configurations (e.g., load addition/deletion, new control equipment, etc.) of an electrical power system. Moreover, the adaptively adjustable systems and methods provided by the present disclosure reduce inventory and selection issues.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
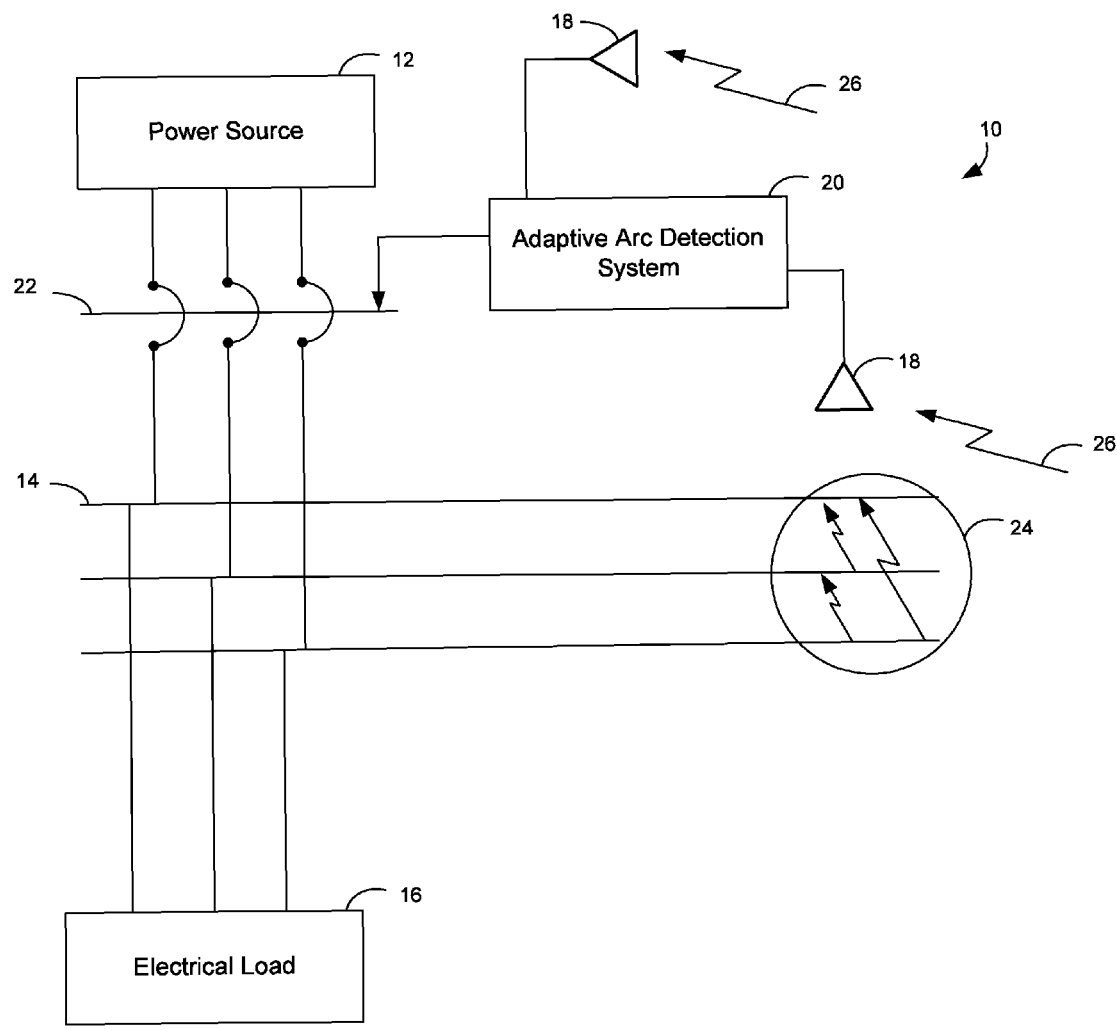
FIG. 1 is a functional diagram of an exemplary electrical power system according to an aspect of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the invention is to cover all modifications, equivalents, and alternatives falling within the spirit and scope of the present disclosure.

DETAILED DESCRIPTION

An arc fault event is generally an unintended, non-useful current through ionized gas (e.g., air) between at least two current carrying conductors, or between at least one current carrying conductor and a neutral conductor or ground. For example, an arc fault event may occur between two conductors when the conductors are too close to each other or a voltage exceeds the insulation level of the conductors. Such arc fault events can produce intense heat (potentially as high as 20,000° C.), light, pressure waves, and sound/shock waves that can pose a threat to the electrical components of an electrical power system. The systems and methods of the present disclosure rely upon the fact that arc fault events in electrical power systems generate light (i.e., light events), which can be detected by light sensors.

However, arc fault events are not the only source of light in electrical power systems. For example, an electrical power system may include other light sources such as, for example, lamps, LEDs, or openings exposed to the environment. Additionally, for example, some electrical power systems include switches, disconnects, circuit breakers, etc. that may generate arcs by interrupting current flowing in conductors. These types of arcs are generally contained and safely handled in the normal course of operation of the electrical power system. Such light events (termed "non-arc fault light events" herein) are typically intended, useful, or harmless events that occur during the normal operation of an electrical power system. The system and methods of the present disclosure adaptively learn to distinguish non-arc fault light events from arc fault events so as to protect an electrical power system from the damaging effects of arc fault events while inhibiting nuisance tripping of protection devices.

Referring to FIG. 1, a functional block diagram of an exemplary electrical power system 10 (e.g., a switchgear cabinet) is illustrated. The electrical power system 10 generally includes an electrical power source 12, a three-phase busbar (or busbar group) 14, and an electrical load 16. The electrical power source 12 (e.g., a generator) provides electrical power to the electrical load 16 (e.g., a motor) via the busbar 14. The electrical power system 10 further includes one or more light sensors 18 that are configured to detect light and generate an electrical signal indicative of the detected light. For example, the light sensors 18 can include photodiodes, photoresistors, phototransistors, photovoltaic cells, photomultipliers, phototubes, charge-coupled devices, LEDs, or fiber optic sensors. One non-limiting example of a commercially available light sensor 18 is an OSRAM SFH203 PFA manufactured by OSRAM Opto Semiconductors GmbH, which is currently headquartered at 3870 North First Street, San Jose, Calif., 95134, that can be biased by, for example, a resistor to generate the signal indicative of the detected light.

The light sensors 18 are communicatively coupled to an adaptive arc detection system 20, which is configured to detect the presence of an arc fault event in the electrical power system 10. The adaptive arc detection system 20 is also configured to generate a fault signal when the adaptive arc detection system 20 detects an arc fault event, as will be described in detail below. The adaptive arc detection system 20 is communicatively coupled to a protection device 22. The protection device 22 is configured to receive the arc fault signal from the adaptive arc detection system 20 and mitigate an arc fault event. For example, the protection device 22 can include one or more circuit breakers, fuses, and/or crowbars provided between the electrical power source 12 and the busbar 14.

Although a three-phase busbar 14 is shown in FIG. 1, it will be appreciated by one of ordinary skill in the art that the aspects of the present disclosure are equally applicable to a single-phase or other multi-phase busbars as well. And although the electrical power system 10 shown in FIG. 1 includes two light sensors 18, more or fewer light sensors 18 can be employed in the electrical power system 10. Moreover, the electrical power system can embody or include other electrical sub-systems having various electrical devices configured for control, protection, or power delivery.

While an arc fault event can occur at any location in the electrical power system 10, arc fault events often occur between the busbars 14 or the busbars 14 and ground. Examples of arc fault events occurring on the busbar 14 is illustrated in FIG. 1 by the reference numeral 24. An example of a non-arc fault light event occurring near the busbar 14 and an example of a non-arc fault light event occurring away from the busbar 14 are illustrated in FIG. 1 by the reference numeral 26. Non-arc fault light events 26 can be generated by, for example, switches, lamps, switchgear, switch boards, circuit breakers, a LV air disconnect associated with a motor control center (MCC) bucket, a window exposed to light from the environment, etc. It is contemplated that the light sensors 18 can be advantageously positioned at locations within the electrical power system 10 where it is anticipated that either arc fault events 24 and/or non-arc fault light events 26 may occur. These non-arc fault light events 26 can generate signatures of light and/or heat having an intensity and/or duration that could otherwise be mistaken for an arc fault light event.

Figure 2:
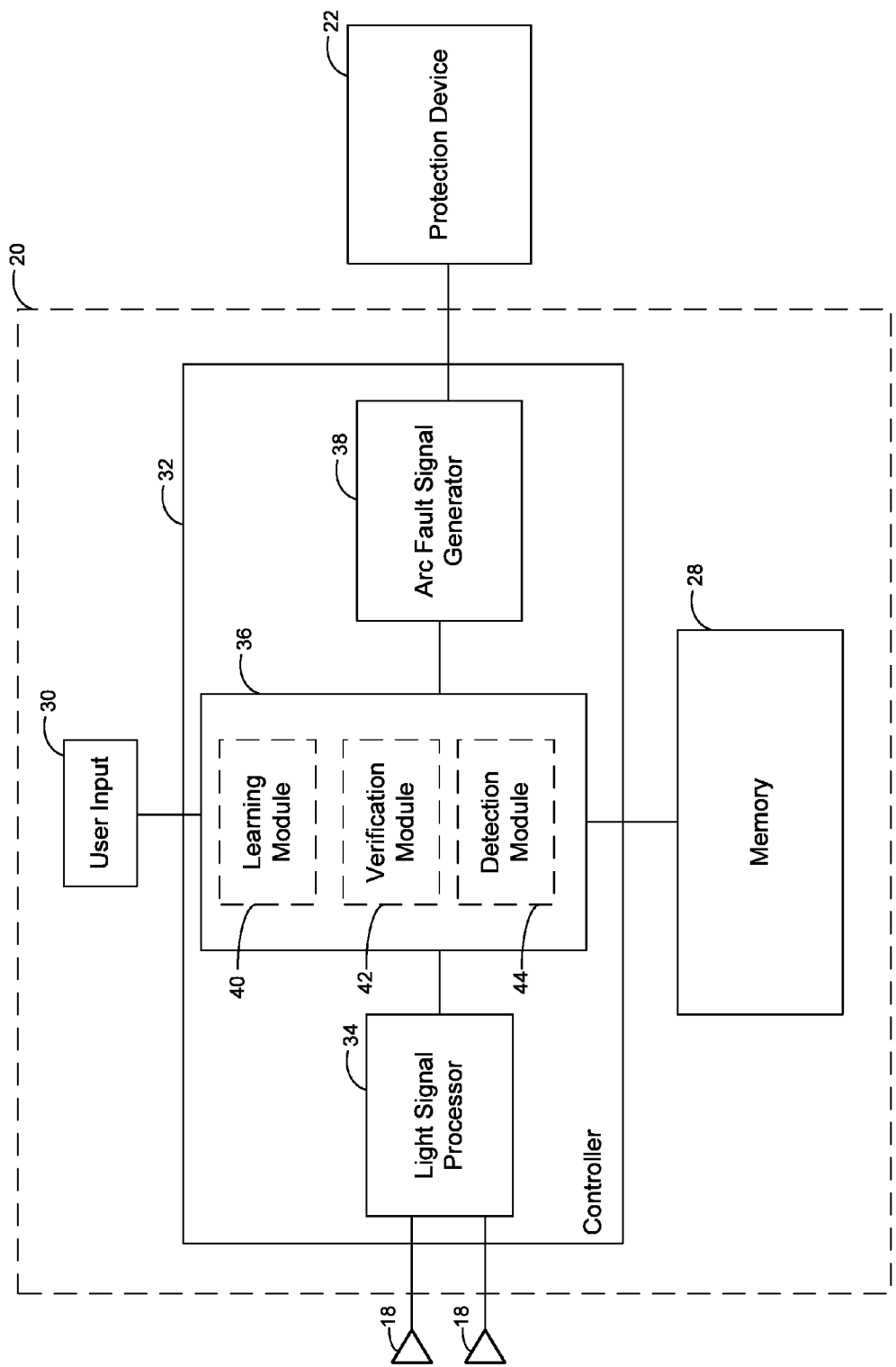
FIG. 2 is a functional diagram of the light sensors, the arc detection system, and the protection device illustrated in FIG. 1.

Referring now to FIG. 2, a block diagram of the light sensors 18, the adaptive arc fault detection system 20, and the protection device 22 is illustrated. The adaptive arc fault detection system 20 includes a memory 28 and a user input device 30 communicatively coupled to a controller 32. Generally, the controller 32 can be implemented as a combination of hardware and software elements. The hardware aspects include combinations of operatively coupled hardware components including microprocessors, logical circuitry, communication/networking ports, digital filters, memory, or logical circuitry. One non-limiting example of a commercially available controller 32 is a Texas Instruments controller model number TMS320LC2406A manufactured by Texas Instruments, which is currently headquartered at 12500 TI Boulevard, Dallas, Tex. 75243.

The controller 32 can include a signal processor 34, a non-transitory computer-readable media 36, and an arc fault signal generator 38. The signal processor 34 is configured to receive and process the light signals from the light sensors 18. For example, the signal processor 34 can be configured to filter the light signals or perform a Fourier transform. The controller 32 is configured to, using the light signals, perform operations specified by a computer-executable code stored on the computer-readable medium 36 to determine whether an arc fault event has been detected. If the controller 32 determines that an arc fault event has been detected, the arc fault signal generator 38 generates and transmits a fault signal to the protection device 22. According to one non-limiting example, the arc fault signal generator 38 can be an operational amplifier level shifter and drive circuit.

In FIG. 2, the signal processor 34 is shown as being part of the controller 32; however, it is contemplated that, according to some embodiments, the signal processor 34 can be implemented separately from the controller 32. According to one embodiment, the signal processor 34 can be a signal conditioning and filtering circuit that includes an operational amplifier configured as a Sallen-Key two pole active filter with a cutoff set to eliminate signal components that cause aliasing due to the sample rate of the analog to digital converter on the controller 32. For example, with a sample rate of 550 kHz, the poles of the filter can be set to have a −3 dB point at 50 kHz. The signal processor 34 can also scale the signal to the input range of the analog to digital converter of the controller 32.

The operations specified by the computer-executable code stored on the computer-readable medium 36 can include a number of functional modules, including a learning module 40, a verification module 42, and a detection module 44 stored on the computer-readable media 36. The user input device 30 is communicatively coupled to the controller 32 to facilitate selection between the functions of the different modules. Although the computer-executable code for the modules is stored on the computer-readable media 36 in the controller 32 in FIG. 2, those having ordinary skill in the art will understand that the code for the modules can be stored in other devices such as, for example, the memory 28. And although three discrete modules are shown in FIG. 2, those having ordinary skill in the art will understand that the functions of any two or more modules can be combined into a single module, or the functions of any single module may be divided into several sub-modules. Each module will now be described in turn.

The detection module 44 is responsible for identifying an arc fault event during normal operation of the electrical power system 10 and, if an arc fault has been identified, generating a fault signal. The detection module 44 identifies an arc fault event using one or more detection algorithms stored in the memory 28. For example, according to some aspects of the present disclosure, the detection module 44 can process a light signal received from the light sensors 18 (or the signal processor 34) to determine one or more characteristics of the light signal using one or more algorithms, neural networks, and/or other mathematical models stored in the memory 28. The one or more characteristics of a light signal can include, but are not limited to, one or a combination of a magnitude of light intensity, a rate of change of a intensity magnitude, a frequency, a wavelength, a duration, a direction or angle of incidence of light incident on the light sensors 18, and/or any other value that can be derived by an algorithm, a neural network, or a mathematical model. As those of ordinary skill in the art will understand, the one or more characteristics of a light signal can be considered a signature of a light signal.

The detection module 44 can then compare the one or more characteristics of the light signal to one or more fault criteria stored in the memory 28. The one or more fault criteria can include, for example, one or more threshold values, ranges of threshold values, or predetermined light signatures. Based on the comparison of the one or more characteristics to the one or more fault criteria, the detection module 44 can determine whether arc fault event has been detected by the adaptive arc fault detection system 20. It is contemplated that, according to some aspects of the present disclosure, the detection module 44 can also be configured to store the time and data associated with detected non-arc fault light events and arc fault events in the memory 28 for later analysis.

The learning module 40 is responsible for adaptively determining the one or more detection algorithms (e.g., one or more algorithms, neural networks, mathematical models, and/or the one or more fault criteria) used by the detection module 44. With the learning module 40 enabled by the user input device 30, the electrical power system 10 is operated to induce or generate non-arc fault light events. For example, a disconnect switch for a motor control center bucket can be opened and closed under various operating conditions (e.g., no load, light load, heavy load, etc.) or an LED light can be activated and deactivated to induce various non-arc fault light events. The light signals received from the light sensors 18 (or the signal processor 34) during such operation of the electrical power system 10 are thus known to be indicative of non-arc fault light events. As a result, the learning module 40 can obtain information about the detected non-arc fault light events, which can be used to determine (or adjust) the one or more detection algorithms used by the detection module 44. Advantageously, a user can thoroughly operate the electrical power system 10 to represent a broad range of operating conditions for the electrical power system 10 so as to obtain as much information as possible about the various non-arc fault light events that can be experienced during normal operation of the electrical power system 10.

According to some aspects of the present disclosure, the learning module 40 can determine the one or more fault criteria. For example, the fault criteria can be a minimum threshold value, and the detection module 44 can be configured to generate a fault signal (indicating an arc fault event) if it determines that the magnitude of intensity of a received light signal is greater than the minimum threshold value.

After (or as) non-arc fault light events are induced and the learning module 40 processes the corresponding light signals, the learning module 40 can determine that a non-arc fault light event resulted in a light signal with a magnitude of light intensity that was greater than the threshold value stored in the memory 28. The learning module 40 can adjust (i.e., determine) the threshold value by storing a greater value in the memory 28. As a result, if the electrical power system 10 is subsequently operated with the detection module 44 enabled, the detection module 44 will not generate a fault signal when future light events are determined to have a magnitude of light intensity equivalent to or less than the magnitudes of light intensity resulting from the non-arc fault light events previously detected with the learning module 40 enabled. As this example demonstrates, if the learning module 40 had not adjusted the threshold value, the detection module 44 may have erroneously generated a fault signal and tripped the protection device 22 in response to a non-arc fault light event during normal operation of the electrical power system 10.

As another example, the one or more fault criteria can be one or more light signatures that were determined by the learning module 40 to correspond to a non-arc fault light event. Thus, when the electrical power system 10 is operated with the detection module 44 enabled, the detection module 44 can compare a light signature determined for a detected light event to the predetermined light signatures stored in the memory 28 as fault criteria. If the light signature determined by the detection module 44 for the detected light event is similar to, the same as, or approximately the same as one of the predetermined light signatures, the detection module 44 can determine that the detected light event is a non-arc fault light event. In other words, the adaptive arc detection system 20 can be taught to selectively ignore certain light signatures that are known to correspond or approximately correspond to a non-arc fault light event.

According to other aspects of the present disclosure, the learning module 40 can determine the one or more algorithms, neural networks, and/or other mathematical models. For example, as or after the learning module 40 processes the light signals from the light sensors 18, the learning module 40 can determine constants, coefficients, programs, and/or data structures for the one or more algorithms, neural networks, and/or other mathematical models. In such embodiments, for example, if the arc detection algorithm includes a neural network, the learning module 40 can employ backpropagation to adjust the neural network.

It is contemplated that, according to aspects of the present disclosure, the learning module 40 can determine only the one or more fault criteria, the learning module 40 can determine only the one or more algorithms, neural networks, and/or other mathematical models, or the learning module 40 can determine both the one or more fault criteria and the one or more algorithms, neural networks, and/or other mathematical models. If the learning module 40 only determines the one or more fault criteria, the one or more algorithms, neural networks, and/or other mathematical models can be determined, for example, at the time of manufacture. Similarly, if the learning module 40 only determines the one or more algorithms, neural networks, and/or other mathematical models, the one or more fault criteria can be determined, for example, at the time of manufacture.

It is contemplated that, according to some aspects of the present disclosure, the user input device 30 can be configured to allow a user to enter information identifying the source of a non-arc fault light event as the electrical power system 10 is operated with the learning module 40 enabled. For example, with the learning module 40 enabled, the user can activate an LED light to induce a non-arc fault light event and indicate via the user input device 30 that the resulting light signal is indicative of an LED light being activated. Advantageously, in embodiments in which the detection module 44 records the time and data associated with non-arc fault light events, the detection module 44 may further record the source of the non-arc fault light event if previously learned by the learning module 40.

Over time, the performance of some components of the electrical power system 10 will change due to normal wear. For example, an air disconnect of a motor control center may experience some erosion over time. Additionally, in some instances, the configuration of the electrical power system 10 may change. For example, loads may be added or deleted, or new control equipment may be added or deleted. Advantageously, the present disclosure provides an arc detection system 20 that can be adaptively adjusted to account for changed conditions (e.g., aging) and configurations (e.g., load addition/deletion, new control equipment, etc.) by enabling the learning module 40 and operating the system as described above. Thus, the present disclosure provides flexible system that can extend the lifespan of many electrical components.

According to some aspects, it is contemplated that the arc detection system 20 can be configured to provide notification to a user that the conditions of the electrical power system 10 have changed and the learning module 40 should be enabled. For example, the arc detection system 20 can notify the user that conditions have changed by determining that non-arc fault light events have changed by a user specified percentage (e.g., the average magnitude of all non-arc fault light events for a given time period has risen by a certain percentage).

The verification module 42 is responsible for verifying that the detection algorithms (e.g., one or more algorithms, neural networks, other mathematical models, and/or the one or more fault criteria) were properly determined by the learning module 40. With the verification module 42 enabled, the electrical power system 10 is operated to induce one or more non-arc fault light events. The verification module 42 receives light signals corresponding to the non-arc fault light events and processes the light signals using the one or more detection algorithms as described above for the detection module. For example, the verification module may determine and compare the one or more characteristics of the light signals to the one or more fault criteria stored in the memory 28 to determine whether an arc fault event was detected. If the verification module 42 determines, based on the comparison, that no arc fault event was detected, the verification module 42 generates a signal indicating that the verification process was successful. However, because the electrical system was operated to induce non-arc fault light events, if the verification module 42 determines that an arc fault event was detected, the verification module 42 may generate an error signal that the learning module 40 failed in some respect.

According to some aspects of the present disclosure, the verification module 42 can also provide information regarding any light signals, which failed the comparison, to the learning module 40 for processing and adjustment of the one or more detection algorithms. For example, the verification module 42 can store information regarding certain light signals in the memory 28 for subsequent retrieval and processing by the learning module 40.

Figure 3:
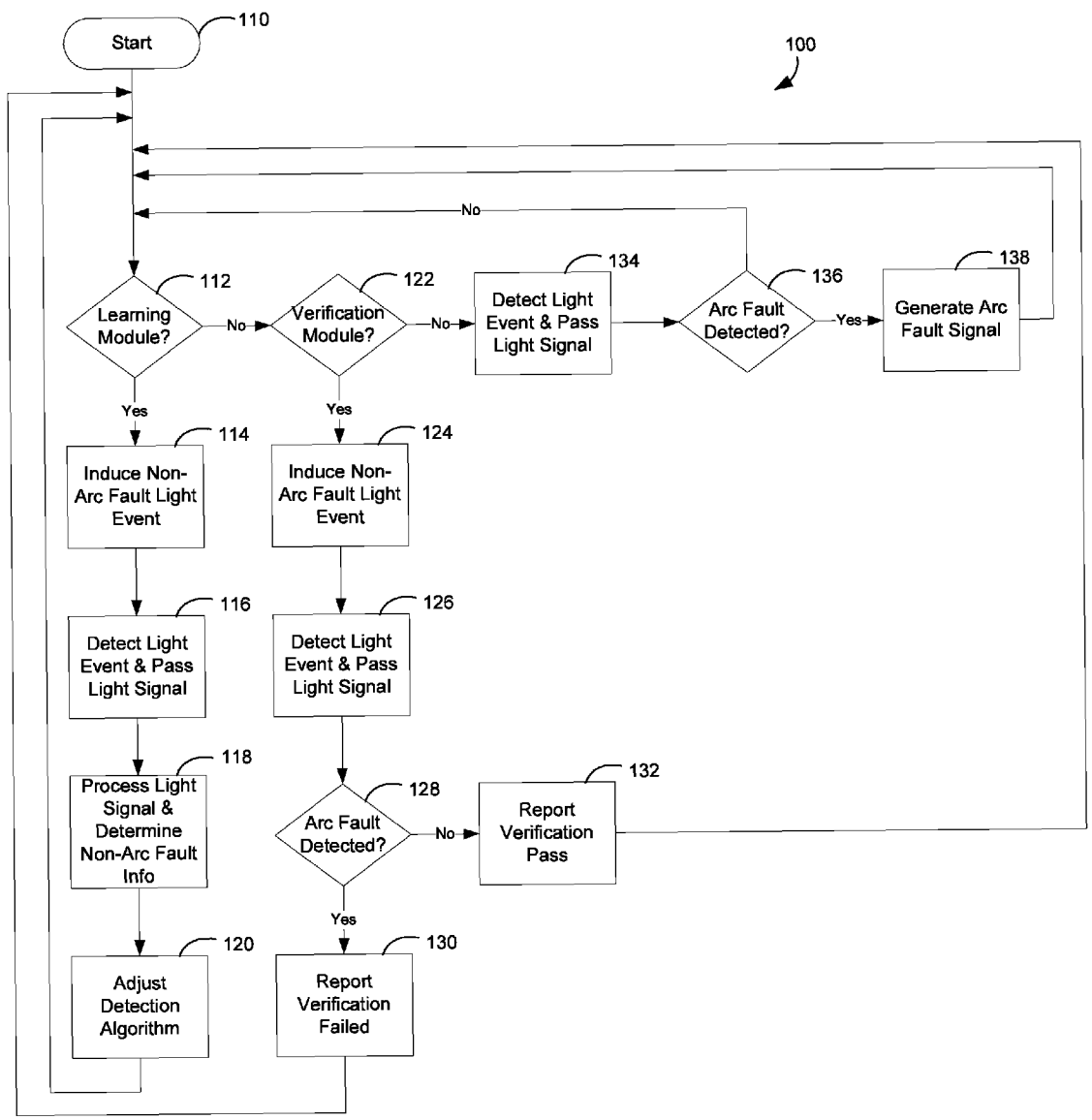
FIG. 3 is a flowchart of an exemplary process for adaptively identifying an arc fault event in an electrical power system according to an aspect of the present disclosure.

Referring now to FIG. 3, a flowchart of a process 100 for adaptively identifying an arc fault event is illustrated. At block 110, the process 100 is initiated. At decision block 112, the controller 32 determines whether the learning module 40 has been enabled by the user input device 30. If the controller 32 determines that the learning module 40 has been enabled at block 112, then the electrical power system 10 is operated to induce a non-arc fault light event at block 114. For example, a disconnect switch for a motor control center bucket can be actuated or an LED light can be activated to induce a non-arc fault light event. At block 116, one or more of the light sensors 18 detects the non-arc fault light event induced at block 114, generates a light signal indicative of the detected non-arc fault light event, and passes the light signal to the controller 32. At block 118, the controller 32 receives the light signal from the one or more light sensors 18 and processes the light signal to determine information about the non-arc fault light event.

At block 120, using the information about the non-arc fault light event, the learning module 40 determines adjustments (if any) to the one or more detection algorithms (e.g., one or more algorithms, neural networks, mathematical models, and/or the one or more fault criteria) used by the detection module 44 and stores such adjustments in the memory 28. For example, the learning module 40 may determine constants, coefficients, programs, and/or data structures for the one or more algorithms, neural networks, and/or other mathematical models. Additionally, for example, the learning module 40 may increase a threshold value, decrease a threshold value, add a range of threshold values, remove a range of threshold values, increase a range of threshold values, decrease a range of threshold values, and/or store a light signature associated with the non-arc fault light event. After block 120, the process returns to block 110.

If the controller 32 determines that the learning module 40 is not enabled at block 112, then the process proceeds to decision block 122. At decision block 122, the controller 32 determines whether the verification module 42 has been enabled by the user input device 30. If the controller 32 determines that the verification module 42 has been enabled at block 122, then the electrical power system 10 is operated to induce a non-arc fault light event at block 124. At block 126, one or more of the light sensors 18 detects the non-arc fault light event induced at block 124, generates a corresponding light signal, and passes the light signal to the controller 32. At decision block 128, the controller 32 receives and processes the light signal to verify whether the arc detection system 20 can determine that the light signal is indicative of a non-arc fault light event. For example, the controller 32 can determine the one or more characteristics of the light signal and compare the one or more characteristics to the one or more fault criteria stored in the memory 28. If the controller 32 determines that an arc fault event was detected at decision block 128, then an error signal is generated indicating that the verification has failed at block 130. After the error signal is generated at block 130, the process returns to block 110. If the controller 32 determines that an arc fault event was not detected at decision block 128, then a signal is generated indicating that the verification passed at block 132. After the signal is generated at block 132, the process returns to block 110.

If the controller 32 determines that the verification module 42 is not enabled at block 122, then the process proceeds to block 134. At block 134, the one or more of the light sensors 18 detects a light event, generates a corresponding light signal, and passes the light signal to the controller 32. At decision block 136, the controller 32 determines whether an arc fault event has been detected in the electrical power system 10. For example, the controller 32 can determine and compare the one or more characteristics to the one or more fault criteria stored in the memory 28. If the controller 32 determines that an arc fault event has been detected, then a fault signal is generated at block 138. After the fault signal is generated, the process returns to block 110. If the controller 32 determines that an arc fault event has not been detected at decision block 136, then the process returns to block 110.

It will be appreciated by those skilled in the art that some of the steps for the process for adaptively identifying an arc fault event 100 can be performed in a different order than that described above. For example, the steps of determining whether the learning module 40 has been enabled at block 112 and determining whether the verification module 42 has been enabled at block 122 can be performed in any order. Additionally, it is contemplated that, according to some aspects, additional steps may be added. For example, an additional step of determining whether the learning module 40 is still enabled can be added between block 118 and block 120 so that steps of block 120 are not performed until it is determined that the learning module 40 is no longer enabled.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An arc fault protection system for an electrical power system, the arc fault protection system comprising:
    a light sensor configured to detect a first visible light event and generate a first light signal indicative of the detected first visible light event, the first visible light event being a non-arc fault event triggered via operation of the system, the light sensor further configured to detect a second light visible event and generate a second light signal indicative of the detected second visible light event;
    a controller in communication with the light sensor, the controller being configured to:
        receive and process the first light signal to determine an arc detection algorithm,
        receive and process the second light signal to determine whether the second light signal is indicative of an arc fault event using the arc detection algorithm, and
        generate an arc fault signal in response to the controller determining that the second light signal is indicative of an arc fault event; and
    a protection device in communication with the controller, the protection device being configured to mitigate the arc fault event in response to the protection device receiving the arc fault signal from the controller.

2. The arc fault protection system of claim 1, wherein the arc detection algorithm includes a fault criteria.

3. The arc fault protection system of claim 2, wherein the controller is configured to determine the fault criteria based on the first light signal.

4. The arc fault protection system of claim 2, wherein the controller is configured to determine a characteristic of the second light signal and compare the determined characteristic to the fault criteria to determine whether the second light signal is indicative of an arc fault event.

5. The arc fault protection system of claim 4, wherein the characteristic is determined by a neural network.

6. The arc fault protection system of claim 5, wherein the controller is configured to determine the neural network based on the first light signal.

7. The arc fault protection system of claim 4, wherein the characteristic includes a plurality of characteristics including a magnitude of light intensity and a rate of change in magnitude of light intensity.

8. The arc fault protection system of claim 2, wherein the fault criteria includes a first light signature based on the first light signal.

9. The arc fault protection system of claim 8, wherein the controller is further configured to:
    determine a second light signature for the second light signal;
    compare the second light signature to the first light signature; and
    based on the comparison, determine whether the second light signal is indicative of an arc fault event.

10. The arc fault protection system of claim 1, wherein the controller is further configured to verify the determination of the arc detection algorithm.

11. The arc fault protection system of claim 1, wherein the controller is further configured to adaptively adjust the arc detection algorithm in response to a changed condition of the arc fault protection system or a changed configuration of a system protected by the arc fault protection system.

12. A method for adaptively identifying an arc fault event in an electrical power system, the method comprising:
    operating the electrical power system to generate a first visible light event triggered by a non-arc fault event;
    detecting the first visible light event with a light sensor;
    generating a first light signal indicative of the detected first visible light event;
    processing, using a controller, the first light signal to determine an arc fault criterion;
    operating the electrical power system to generate a second visible light event;
    detecting the second visible light event with the light sensor;
    generating a second light signal indicative of the second visible light event;
    processing the second light signal to determine a characteristic of the second light signal; and
    comparing the characteristic to the arc fault criterion to determine whether the second light signal is indicative of an arc fault event.

13. The method of claim 12, wherein the characteristic of the second light signal includes one or more of a magnitude of light intensity, a rate of change of a intensity magnitude, a frequency, a wavelength, a duration, or a direction or angle of incidence of light incident on the light sensor.

14. The method of claim 12, wherein the criterion includes one or more of a threshold value, a range of threshold values, or a predetermined light signature.

15. The method of claim 12 further comprising receiving from an input device an input indicative of the source of the first visible light event.

16. The method of claim 12 further comprising storing information about the second light signal in a memory if the second light signal is determined not to be indicative of an arc fault event.

17. The method of claim 12, further comprising adaptively adjusting the arc fault criterion in response to a changed condition of the arc fault protection system or a changed configuration of a system protected by the arc fault protection system.

18. An arc fault protection system for an electrical power system, the arc fault protection system comprising:
    a light sensor configured to detect a first light event and generate a first light signal indicative of the detected first light event, the first light event being a non-arc fault event, the light sensor further configured to detect a second light event and generate a second light signal indicative of the detected second light event;

a controller in communication with the light sensor, the controller being configured to:
  determine an arc detection algorithm based on the first light signal,
  verify the arc detection algorithm based on an induced non-arc fault light event, the verification including an error signal that is generated if the induced non-arc fault light event is determined to be an arc fault light event based on the arc detection algorithm; and
  determine whether the second light signal is indicative of the arc fault event based on the arc detection algorithm and generate a fault signal if the controller determines that the second signal is indicative of the arc fault event; and
a protection device in communication with the controller, the protection device being configured to mitigate the arc fault event in response to the protection device receiving the fault signal from the controller.

19. The arc fault protection system of claim 18 further comprising an input device configured to selectively cause the controller to determine the arc detection algorithm, verify the arc detection algorithm, or determine whether the second light signal is indicative of the arc fault event.

20. The arc fault protection system of claim 18, wherein the arc detection algorithm includes a neural network.

21. The arc fault protection system of claim 18, wherein the arc detection algorithm includes a comparison of the first light signature corresponding to the first light signal and a second light signature corresponding to the second light signal.

22. The arc fault protection system of claim 18, wherein the light sensor is configured to detect the first light event and the second light event as visible light, the first light signal and the second light signal being indicative of the visible light detected by the light sensor for the first light event and the second light event, respectively.

* * * * *